US009112585B2

(12) United States Patent
Schiffman

(10) Patent No.: US 9,112,585 B2
(45) Date of Patent: Aug. 18, 2015

(54) DISPOSABLE PROTECTION ENCLOSURE FOR PORTABLE ELECTRONIC DEVICES

(75) Inventor: Michael Schiffman, Boca Raton, FL (US)

(73) Assignee: Nash Martin Holdings, LLC, Boca Raton, FL (US)

( * ) Notice: Subject to any disclaimer, the term of this patent is extended or adjusted under 35 U.S.C. 154(b) by 524 days.

(21) Appl. No.: 13/521,547

(22) PCT Filed: Jan. 11, 2011

(86) PCT No.: PCT/US2011/020845
§ 371 (c)(1),
(2), (4) Date: Jul. 11, 2012

(87) PCT Pub. No.: WO2011/085374
PCT Pub. Date: Jul. 14, 2011

(65) Prior Publication Data
US 2012/0285587 A1 Nov. 15, 2012

Related U.S. Application Data

(60) Provisional application No. 61/293,963, filed on Jan. 11, 2010, provisional application No. 61/293,954, filed on Jan. 11, 2010.

(51) Int. Cl.
*B65D 85/00* (2006.01)
*H04B 1/3888* (2015.01)
(Continued)

(52) U.S. Cl.
CPC .............. *H04B 1/3888* (2013.01); *A45C 11/22* (2013.01); *A45C 13/002* (2013.01); *A45C 13/008* (2013.01)

(58) Field of Classification Search
CPC . G06F 1/1628; A45C 2013/025; A45C 11/22
USPC ......... 206/320, 701, 576, 720, 722, 726, 811; 383/113, 108
See application file for complete search history.

(56) References Cited

U.S. PATENT DOCUMENTS 4,773,427 A * 9/1988 Inoue et al. .................. 600/509
5,549,375 A    8/1996 Pagliaccio
(Continued)

FOREIGN PATENT DOCUMENTS

| JP | 09108024 | 4/1997 |
|---|---|---|
| KR | 100831090 | 5/2008 |
| WO | 2009050602 | 4/2009 |

OTHER PUBLICATIONS

International Search Report and Written Opinion for International Application No. PCT/US2011/020845 dated Nov. 21, 2011.
(Continued)

*Primary Examiner* — Jacob K Ackun
*Assistant Examiner* — Jenine Pagan
(74) *Attorney, Agent, or Firm* — Fleit Gibbons Gutman Bongini & Bianco PL; Jon A. Gibbons

(57) ABSTRACT

One or more embodiments disclose a sealable membrane for protecting portable electronic devices. The sealable membrane includes an enclosure including a material that is reactive to a stimulus. The enclosure includes at least one opening configured to receive a portable electronic device thereinto. The enclosure includes an inside surface and an outside surface. An annular member is insertable into the opening. An outside surface of the annular member forms a seal with the inside surface of the enclosure. The annular member forms a rigid conduit into the enclosure. The annular member is configured to receive a retaining member thereinto. The retaining member retains a sealing member within the annular member. The sealing member prevents access to the opening of the enclosure.

11 Claims, 16 Drawing Sheets

(51) Int. Cl.
*A45C 11/22* (2006.01)
*A45C 13/00* (2006.01)

(56) References Cited

U.S. PATENT DOCUMENTS

| | | | |
|---|---|---|---|
| 5,944,173 A | 8/1999 | Boire et al. | |
| 6,068,119 A * | 5/2000 | Derr et al. | 206/305 |
| 6,137,685 A | 10/2000 | Morinaga | |
| 6,178,086 B1 | 1/2001 | Sim et al. | |
| 6,289,896 B1 * | 9/2001 | Hart | 128/897 |
| 6,321,980 B1 | 11/2001 | Yazumi et al. | |
| 6,995,976 B2 * | 2/2006 | Richardson | 345/173 |
| 7,324,349 B2 | 1/2008 | Wobig et al. | |
| 8,399,764 B2 * | 3/2013 | Klosky | 174/50 |
| 2001/0026650 A1 | 10/2001 | Denko | |
| 2002/0012480 A1 | 1/2002 | Konno | |
| 2002/0137475 A1 * | 9/2002 | Shou et al. | 455/90 |
| 2005/0213293 A1 | 9/2005 | Chen | |
| 2005/0279661 A1 | 12/2005 | Hodges | |
| 2007/0014491 A1 * | 1/2007 | MacAuley et al. | 383/59 |
| 2007/0087725 A1 | 4/2007 | Anderson | |
| 2007/0215663 A1 | 9/2007 | Chongson et al. | |
| 2007/0261978 A1 * | 11/2007 | Sanderson | 206/320 |
| 2009/0268992 A1 | 10/2009 | Brouwer | |
| 2010/0246111 A1 | 9/2010 | Yokota et al. | |
| 2010/0310194 A1 | 12/2010 | Archambault | |
| 2012/0285587 A1 | 11/2012 | Schiffman | |

OTHER PUBLICATIONS

International Search Report and Written Opinion for International Application No. PCT/US2011/020851 dated Sep. 29, 2011.
Notice of Allowance dated Jun. 10, 2014 received for U.S. Appl. No. 13/521,567.
Non-Final Office Action dated Sep. 25, 2013 received for U.S. Appl. No. 13/521,567.
Ex Parte Quayle Action dated Mar. 28, 2013 received for U.S. Appl. No. 13/521,567.

* cited by examiner

DISPOSABLE PROTECTION ENCLOSURE FOR PORTABLE ELECTRONIC DEVICES

CROSS-REFERENCE TO RELATED APPLICATIONS

This application is based upon and claims priority from U.S. Provisional Patent Application No. 61/293,954, filed on Jan. 11, 2010 and U.S. Provisional Patent Application No. 61/293,963, filed on Jan. 11, 2010, the entire disclosure of each individual aforementioned application is herein incorporated by reference in their entirety

FIELD OF THE INVENTION

The present invention generally relates to portable electronic devices, and more particularly relates to disposable protection enclosures for temporarily protecting portable electronic devices.

BACKGROUND OF THE INVENTION

Portable electronic devices have become increasingly popular over the past years. Individuals usually carry one or more portable electronic devices, such as a cellular phone or an audio player, with them regardless of their location. Many individuals try to protect their devices by using a case/pouch. These cases/pouches can be expensive and cumbersome. Also, in some circumstances an individual may not want to bring their case/pouch with them or may not even have one altogether.

For example, an individual may be at a location such as a resort and may want to take their device to the pool, the beach, etc. If a user has a conventional case/pouch, these cases/pouches generally only protect a device from minor bumps/falls and not from water, sand, etc. If the user does not have a protective case/pouch then the user may have to buy a case/pouch at the resort, which can be expensive, or will have to risk his/her device becoming wet or encountering debris. Therefore, current solutions generally fail to adequately provide portable electronic devices with inexpensive protection from the elements.

SUMMARY OF THE INVENTION

In one embodiment, a sealable membrane for protecting portable electronic devices is disclosed. The sealable membrane comprises an enclosure comprising a material that is reactive to a stimulus. The enclosure comprises at least one opening configured to receive a portable electronic device thereinto. The enclosure comprises an inside surface and an outside surface. An annular member is insertable into the opening. An outside surface of the annular member forms a seal with the inside surface of the enclosure. The annular member forms a rigid conduit into the enclosure. The annular member is configured to receive a retaining member thereinto. The retaining member retains a sealing member within the annular member. The sealing member prevents access to the opening of the enclosure.

In another embodiment, end cap for use with a sealable membrane that protects portable electronic devices is disclosed. The end cap comprises an annular member that is insertable into an opening of a sealable membrane used for protecting portable electronic devices. The annular member comprises a top portion and a bottom portion. Each of the top portion and the bottom portion comprises an outer surface and an inner surface. The outer surface of the top and bottom portions is configured to form a seal with an inside surface of a sealable membrane. The annular member further comprises an opening situated between the inner surface of the top portion and the inner surface of the bottom portion. A sealing member is disposed at a location that is at least one of flush with the opening of the annular member and at least partially within the opening of the annular member. The sealing member prevents access to an inner area of the sealable membrane through the opening of the annular member. A retaining member is coupled to at least one portion of the annular member. The retaining member retaining the sealing member at this location.

In yet another embodiment, a sealable membrane for protecting portable electronic devices is disclosed. The sealable membrane comprises an enclosure comprising a material that is reactive to a stimulus. The enclosure comprises at least one opening configured to receive a portable electronic device thereinto. The enclosure comprising an inside surface and an outside surface. An end cap is insertable into the opening. The end cap comprises an annular member comprising a comprising a top portion and a bottom portion. Each of the top portion and the bottom portion comprises an outer surface and an inner surface. The outer surface of the top and bottom portions forms a seal with the inside surface of the enclosure. The annular member forms a rigid conduit into the enclosure. The annular member further comprises an opening situated between the inner surface of the top portion and the inner surface of the bottom portion. A sealing member is disposed at a location that is at least one of flush with the opening of the annular member and at least partially within the opening of the annular member. The sealing member prevents access through the opening of the annular member. A retaining member is coupled to at least one portion of the annular member. The retaining member retains the sealing member at the location. The annular member further comprises a first wall that extends from the inner surface of the top portion to the inner surface of the bottom portion, and a second wall that extends from the inner surface of the top portion to the inner surface of the bottom portion. The opening is disposed between the first wall and the second wall. The first wall and the second wall each comprises an outer region that is angled away from the opening. Each outer region comprises a recessed area. The retaining member comprises a first side portion, a second side portion, and a middle portion. The first and second side portions extend from the middle portion and are angle away from the middle portion. An end region of each of the first and second side portions of the retaining member comprises an angled protruding member configured to mate with the recessed area of the outer region of the first and second walls of the annular member, respectively.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Disposable Protection Device for Portable Electronics

Figure 1:
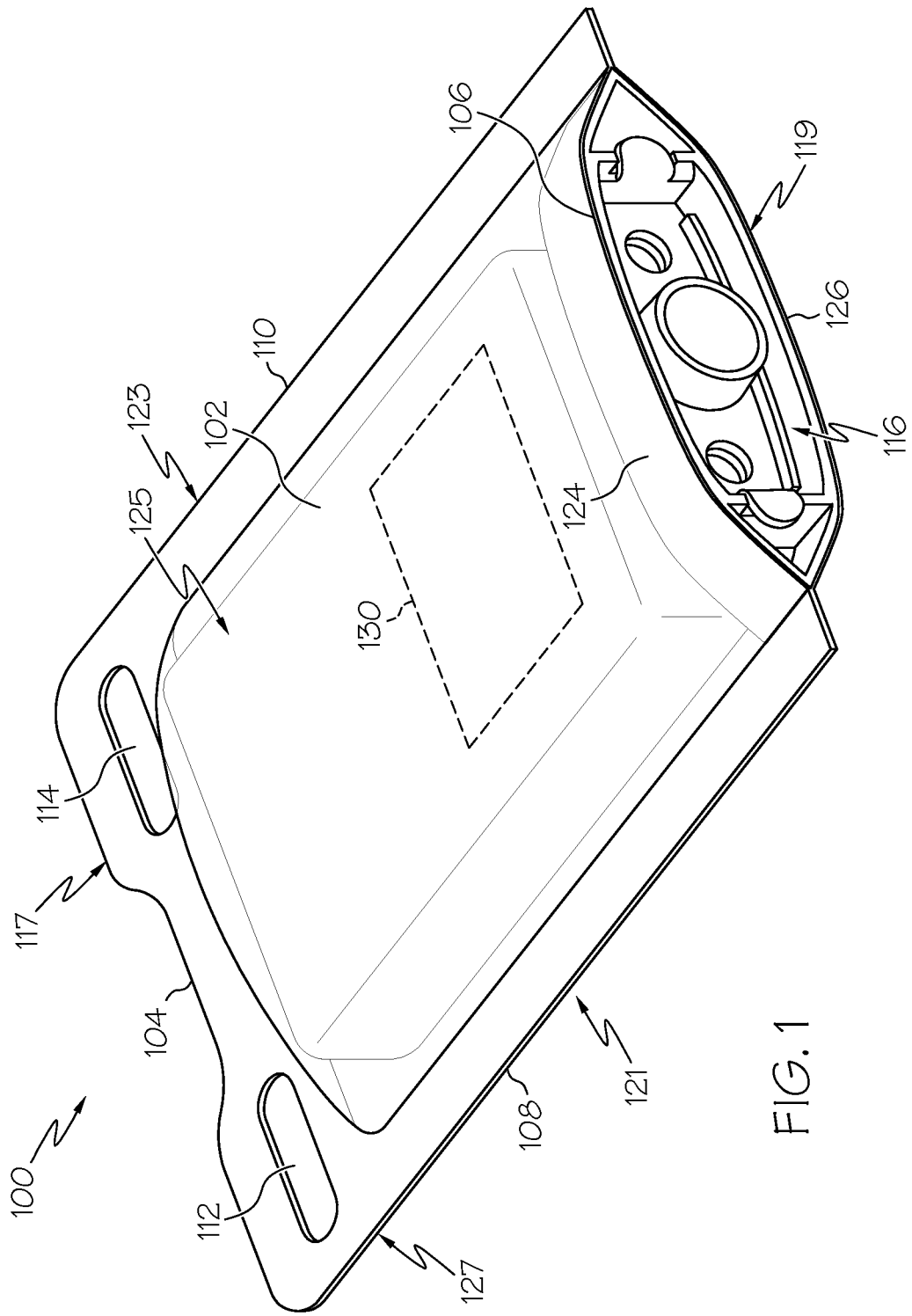
FIG. 1 illustrates a disposable protection enclosure/device that protects portable electronic devices according to one embodiment of the present invention.

According to one embodiment, FIG. 1 illustrates a disposable protection enclosure/device 100 that protects portable electronic devices 102 from various hazards such as water, snow, sand, dirt, debris, bumps/shocks, and the like. The enclosure 100 comprises one or more materials that are reactive to a stimulus such as heat, UV-A/UV-B rays, a vacuum, and the like. The material can also be eco-friendly (e.g., biodegradable, made from recycled material, etc.). The material, in one embodiment, is breathable to allow heat to escape from the inside of the enclosure 100 to the outside of the enclosure 100. In another embodiment, one or more vented areas are disposed on an end cap/plug 116 discussed below.

When heat, for example, is applied to the enclosure 100 a seal is created around the outer edges 104, 106, 108, 110 of the enclosure 100. This seal prevents water, dirt, sand, debris, and other foreign objects from entering the protective enclosure 100. The sealing/forming process and related system are further discussed in the commonly owned U.S. patent application Ser. No. 13/521,567, now U.S. Pat. No. 8,861,194, entitled "PORTABLE ELECTRONIC DEVICE PROTECTION SYSTEM", by inventor Michael Schiffman filed on Jan. 11, 2011, which is hereby incorporated by reference in its entirety. In another embodiment, the material of the enclosure 100 can substantially conform to at least a portion of the portable electronic device 102 within the enclosure 100. One or more areas of the enclosure 100 can also remain flexible or can become rigid/semi-rigid in response to the stimulus. The enclosure 100 can be sized during the sealing/forming process to conform to many different portable electronic devices of varying sizes and shapes.

In one embodiment, at least one side/surface of the enclosure 100 (e.g., the side facing the display of the portable electronic device 102) is substantially clear or transparent. This allows the user to view and interact with the display, keyboard, trackball, buttons, and/or other components of the device 102. The enclosure 100 is also configured to allow the user to hear audio emitted from the device 102, allow the device 102 to receive audio emitted by the user, allow the user to feel tactile events emitted from the device 102, and/or the like. Other areas/surfaces of the enclosure 100, such as a top area/surface 117, bottom area/surface 119, side area/surface 121, 123, front area/surface 125, and back area/surface 127, can be configured with different colors, designs, ads, graphics, and the like. Also, the enclosure 100 (or at least one or more portions of the enclosure 100) can remain pliable after the sealing/forming process so that the user can interact with the buttons, display, keys, etc. of the device 102. In one embodiment, one or more of the enclosure surfaces are treated with an anti-microbial coating to reduce the transmission of germs in a contagious environment such as a hospital.

The protective enclosure 100, in one embodiment, includes various features such as one or more areas 112, 114 for receiving a coupling mechanism such as a lanyard. The protective enclosure 100, in one embodiment, can also include one or more caps or plugs 116 that can be situated on the top 117, bottom 119, and/or side portion(s) 121, 123 of the protective enclosure 100. FIG. 1 shows an end cap/plug 116 being situated on the bottom portion 119 of the protective enclosure 100 with respect to the portable electronic device 102.

Figure 2:
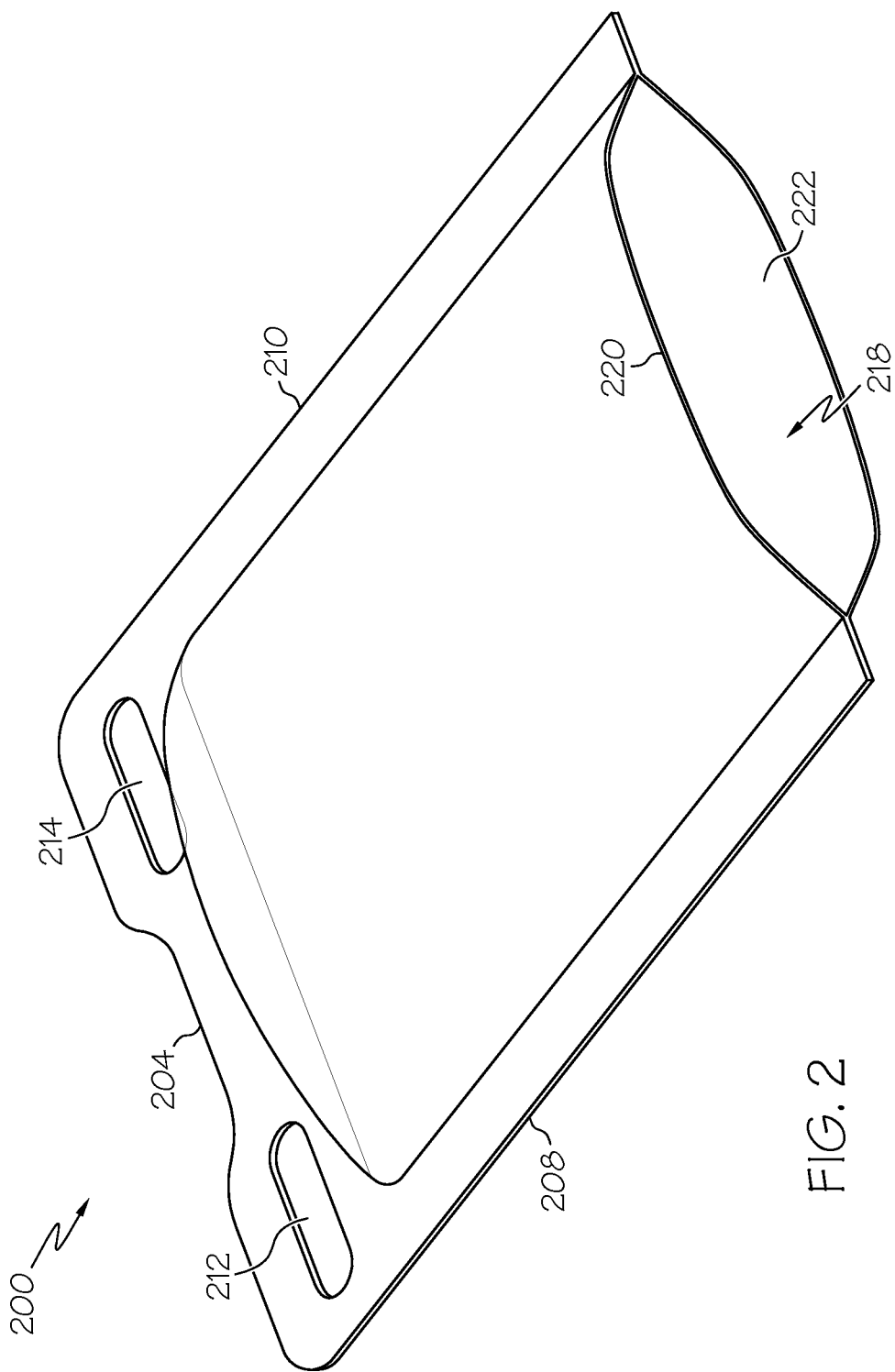
FIG. 2 illustrates a portion of the disposable protection device of FIG. 1 according to one embodiment of the present invention.

In one embodiment, the end cap/plug 116 is separate from the enclosure material prior to the sealing/forming process, as shown in FIG. 2. In this embodiment, a seal is already formed around one or more edges 204, 208, 210 of the enclosure material 200 with the exception of at least one portion of the enclosure material 200. For example, FIG. 2 shows an opening 218 that allows the portable electronic device 102 (and any accessories such as wires) to be inserted into the enclosure 100. Once the device 102 (and any accessories) are inserted, the end cap/plug 116 can be inserted into the opening 218 such that a portion 220, 222 of the enclosure material contacts (or at least aligns with) an outer wall 124, 126 of the end cap/plug 116. Therefore, when the sealing/forming process is performed, a seal is created between the portion(s) 220, 222 of the enclosure material and the outer wall 124, 126 of the end cap/plug 116. FIG. 2 also shows that the coupling device receiving areas 212, 214 have already been formed prior to the sealing/forming process, but this is not required and can be formed after or during the sealing/forming process.

Figure 3:
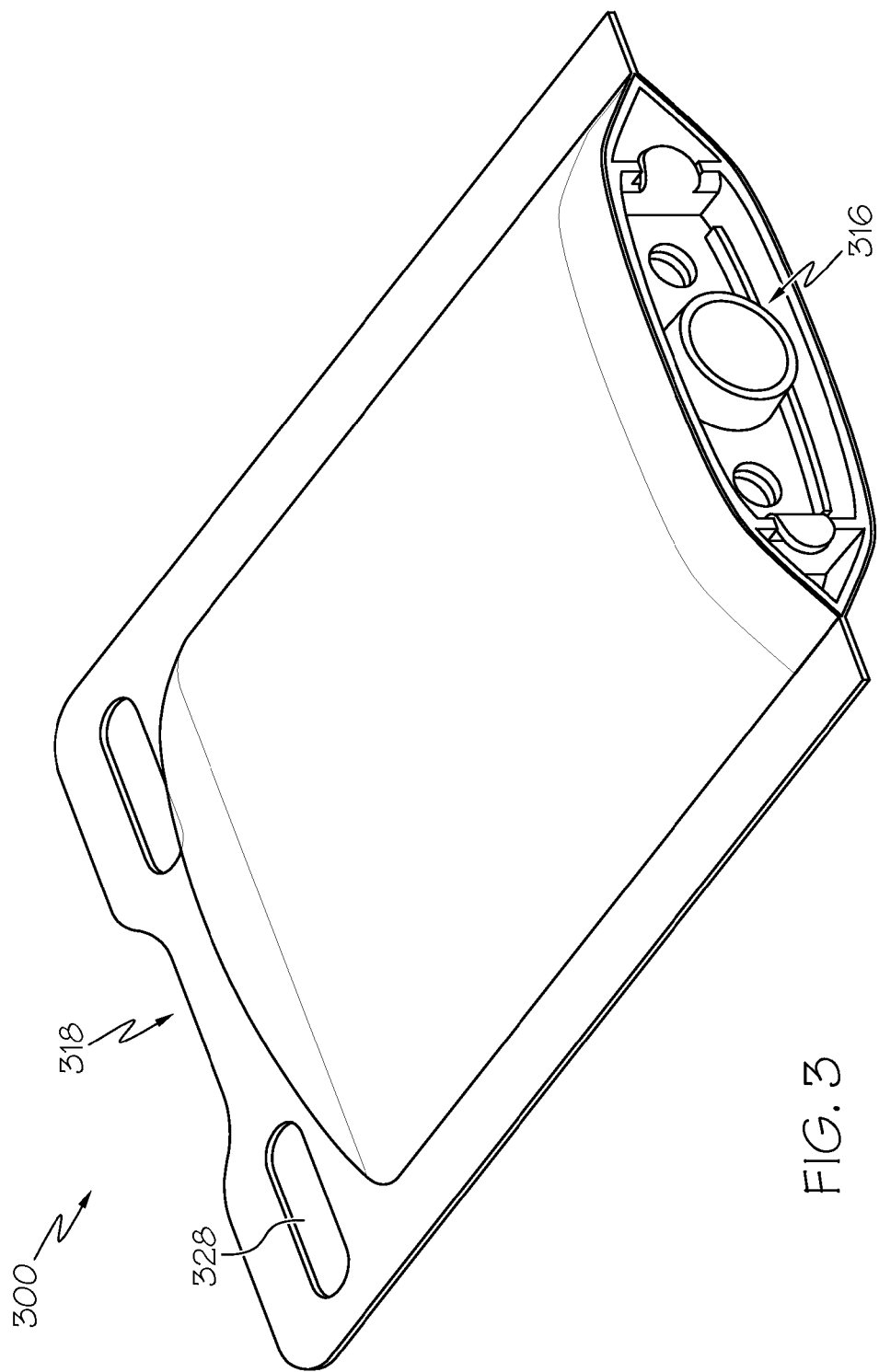
FIG. 3 illustrates yet another portion of the disposable protection device of FIG. 1 according to one embodiment of the present invention.

FIG. 3 shows another embodiment, where the end cap/plug 316 is already coupled to the enclosure 300 prior to the sealing/forming process. In this embodiment, the enclosure 300 comprises an opening 318 that allows the portable electronic device 102 (and any accessories such as wires) to be inserted into the enclosure 100. In one embodiment, the opening 318 is disposed on an end 328 of the enclosure 300 that is opposite from the end cap/plug 316. However, the opening 318 can be disposed on one or more of the side portions of the enclosure 300 as well.

Returning to FIG. 1, some portable electronic devices comprise a trackball or other type of pointing device for selecting or interacting with items on the display of the device. Therefore, in one embodiment, at least a portion 130 of the disposable protective enclosure 100 that is disposed over the trackball, pointer, etc. is configured to provide the user with additional control over the pointing device. For example, this portion 130 of the enclosure 100 can include a raised area or a bubble that contacts the pointing device. As the user moves this raised area or bubble a portion of the raised area/bubble contacts the pointing device and allows the user to interact with the pointing device through the enclosure 100.

In another embodiment, this portion 130 of the enclosure can comprise a "flap" like configuration. In this embodiment, the portion 130 includes an adhesive or similar substance that keeps the flap closed and creates a seal around the flap. When the user wants to use the pointing device, the "flap" can be opened to allow access to the pointing device. When the user is finished, the flap is closed and the adhesive creates a seal around the flap. In another embodiment, this portion 130 comprises a resilient material such as (but not limited to) latex. The friction from the resilient material causes the pointing device to move when a user interacts with the pointing device. When a user is finished with the pointing device the material returns back to its original configuration due to its resilient nature. In another embodiment, this portion 130 can comprise a "cut-out" area with the resilient material covering the "cut-out" area. In an additional embodiment, this portion 130 can comprise a substance that temporarily adheres to (or at least causes friction against) the user's finger. This allows for the user to "grab" the enclosure 100 so that the pointing device can be moved. It should be noted that the enclosure 100 can also be configured without the portion 130 discussed above.

Figure 4:
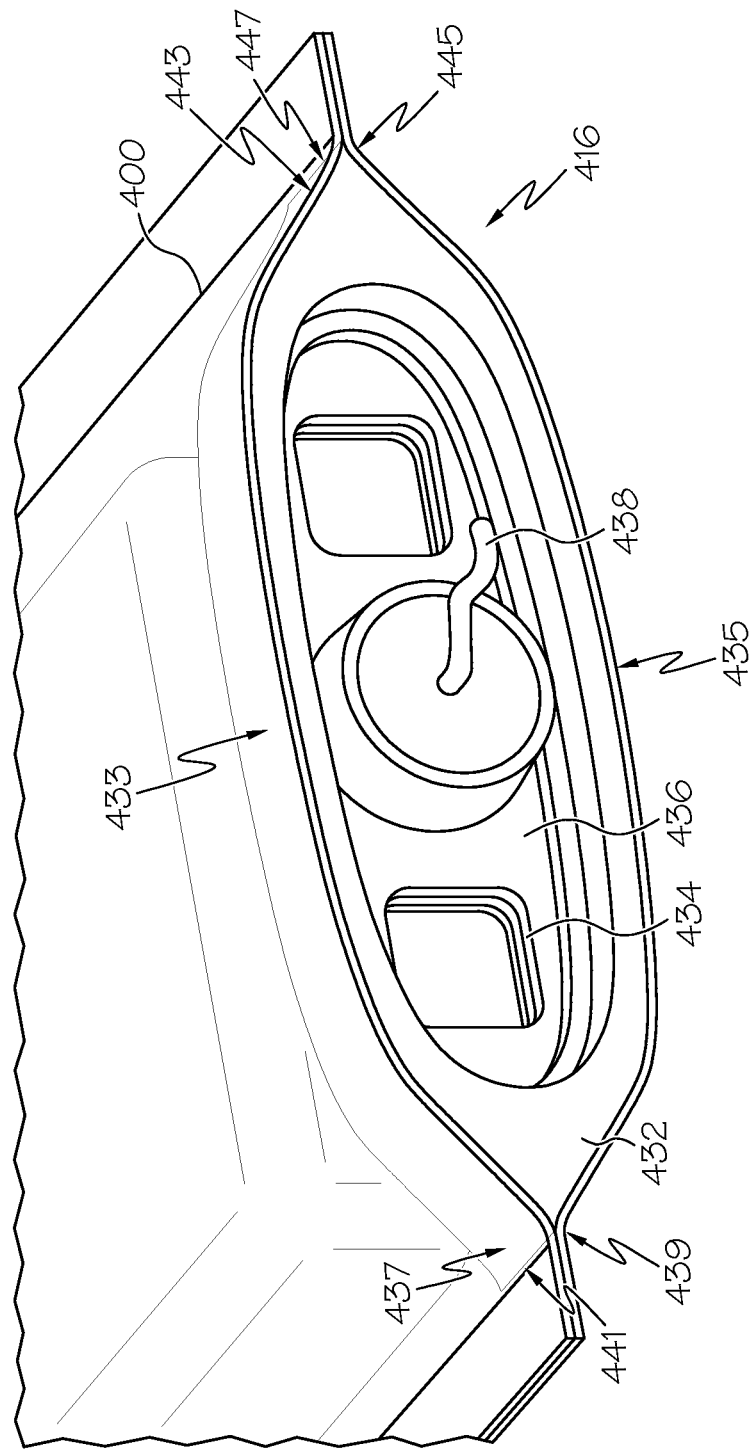
FIG. 4 illustrates an end cap/plug of the disposable protection device of FIG. 1 according to one embodiment of the present invention.

As discussed above, the disposable protective enclosure 100 includes an end cap/plug that creates an accessible seal at the portion of the enclosure 100 where the end cap/plug is disposed. FIG. 4 shows a more detailed view of an end cap/plug 416. In particular, FIG. 4 shows that the end cap/plug 416 includes an outer ring structure 432 (also referred to as "an annular member 432"), one or more seals 434, and a seal retaining member 436. The outer ring structure 432, in one embodiment, comprises a first portion 433 and a second portion 435. A first end 437 of the first portion 433 meets a first end 439 of the second portion 435 creating a first knife-edge portion 441. A second end 443 of the first portion 433 meets a second end 445 of the second portion 435 creating a second knife-edge configuration 447. This configuration of the outer ring structure 432 substantially matches the geometry of the opening 218 of the enclosure material 200, as shown in FIG. 2. This ensures that a tight seal is created between the enclosure material 200 and the end cap/plug 416. It should be noted that the outer ring structure 432 can comprise other configurations as well.

Figure 5:
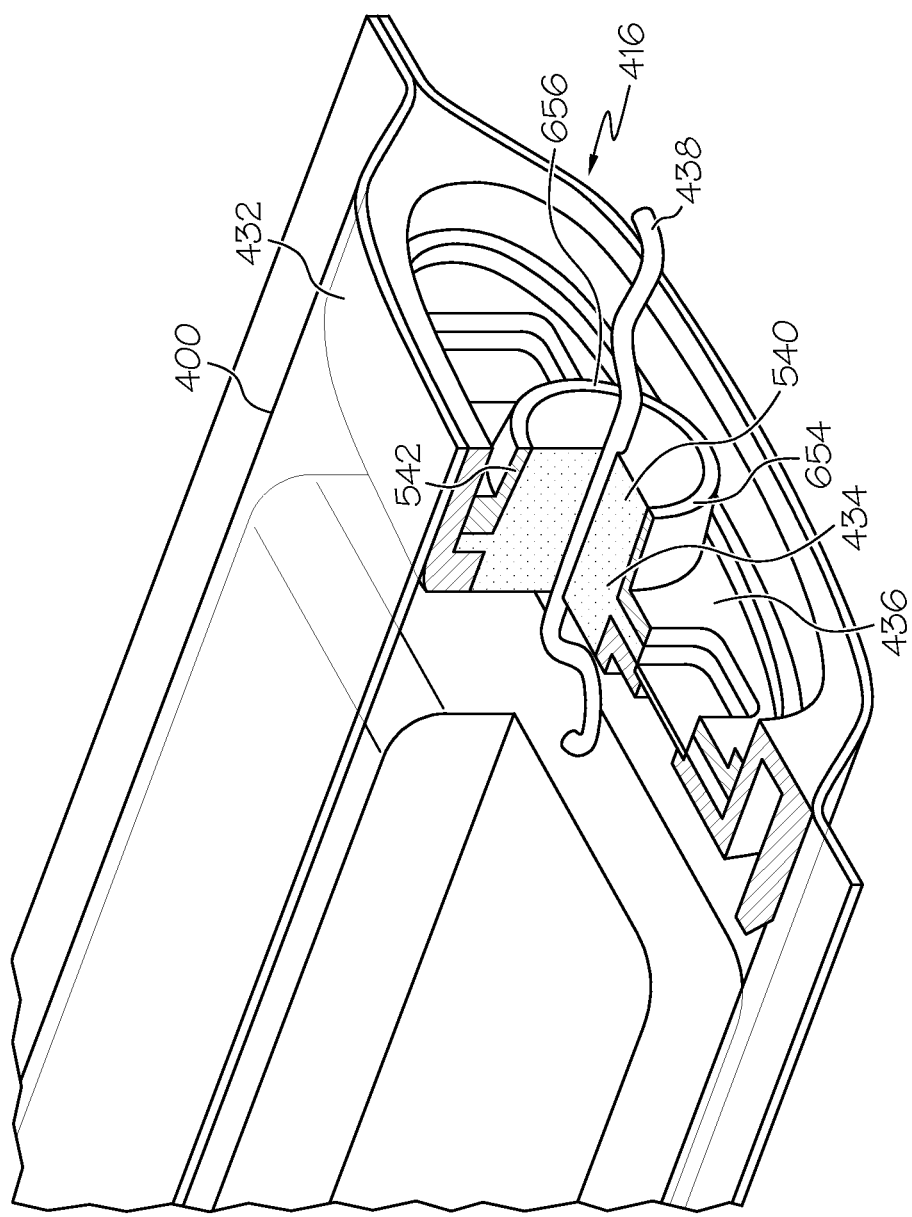
FIG. 5 shows a cross-sectional view of the end cap/plug of FIG. 4 according to one embodiment of the present invention.

The seals 434 and the seal retaining member 436 are configured to allow one or more wires 428 to pass from within the enclosure 400 to outside of the enclosure 400 while maintaining a seal. For example, FIG. 5 shows a cross-sectional view of the end cap/plug 416 of FIG. 4. As can be seen, a portion 540 of the seal 434 resides within a portion 542 of the seal retaining member 436. The seal 434 can comprise of resilient material that conforms around the wire(s) 438 while maintaining a seal around the wire 438.

Figure 6:
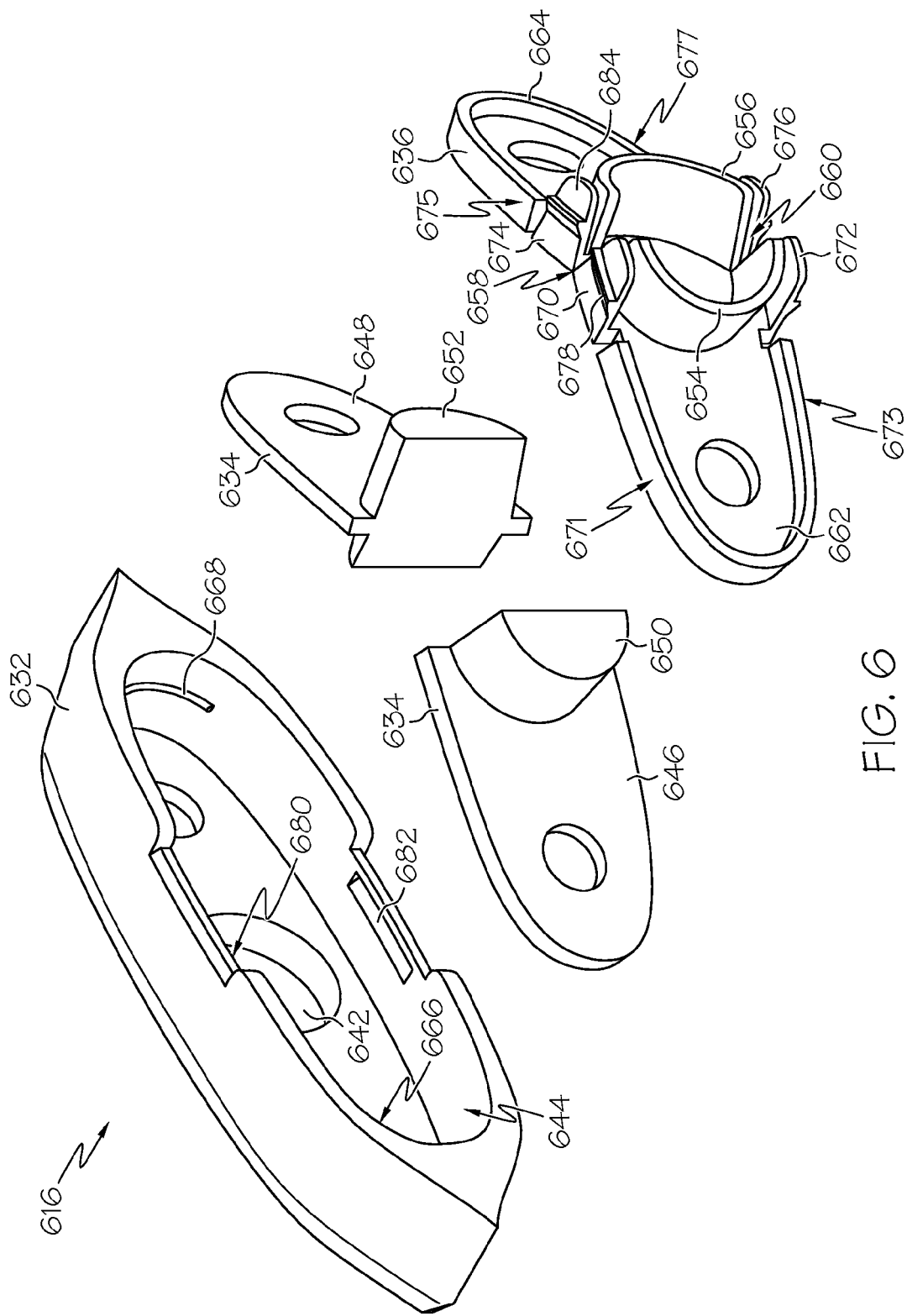
FIGS. 6-16 show various examples of an end cap/plug for the disposable protection device of FIG. 1 according to various embodiments of the present invention.

FIG. 6 shows an exploded view of an end cap/plug 616 according to one embodiment of the present invention. In particular, FIG. 6 shows a ring structure 632, one or more seals 634, and the seal retaining member 636. The ring structure 632 can be comprised of any material that can resist heat, water, and the like. For example, the ring structure 632 and the seal retaining member 636 can be comprised of plastics, metal, metal alloys, and the like. The seal 634 also comprises a material that is resistant to heat and moisture. However, as discussed above, the seal 634 is a resilient material such as (but not limited to) foam, rubber, etc.

The ring structure 632 comprises at least one opening 642 that provides access to the inside of the enclosure 100. The ring structure 632 also comprises a recessed area 644 for receiving the seal 634 and the seal retaining member 636. The seal 634, in one embodiment, comprises two portions 646, 648 that when inserted into the recessed area 644 of the ring structure 632 effectively create a single piece. This configuration of the seal 634 allows for a wire(s) coupled to the portable electronic device 102 to exit the enclosure 100 while still maintaining a protective seal. For example, the two portions 646, 648 of the seal "sandwich" the wire, thereby creating a seal around the wire. Each portion 646, 648 comprises an extended portion 650, 652 that is configured to be received by a corresponding portion 654, 656 of the seal retaining member 636.

The seal retaining member 636, in one embodiment, comprises one or more hinged portions 658, 660 that allow the seal retaining member 636 to securely retain the seal 634 within the recessed area 644 and to securely retain the two extending portions 650, 652 together. The hinged configuration of the seal retaining member 636 also provides for easy insertion/removal of the seal retaining member 363 into/from the recessed area 644 of the ring structure 632. For example, as the seal retaining member 636 is a hinged position as shown in FIG. 6, a user is able to apply a force when inserting the seal retaining member 636 into the recessed area 644. This causes a first and second portion 662, 664 of the seal retaining member 636 to become fully extend and "snap" into place within the recessed area 644. This insertion process also causes the portions 654, 656 of the seal retaining member 636 that receive the extended portions 650, 652 of the seal 634 to become flush with one another, as shown in FIG. 5.

Figure 7:
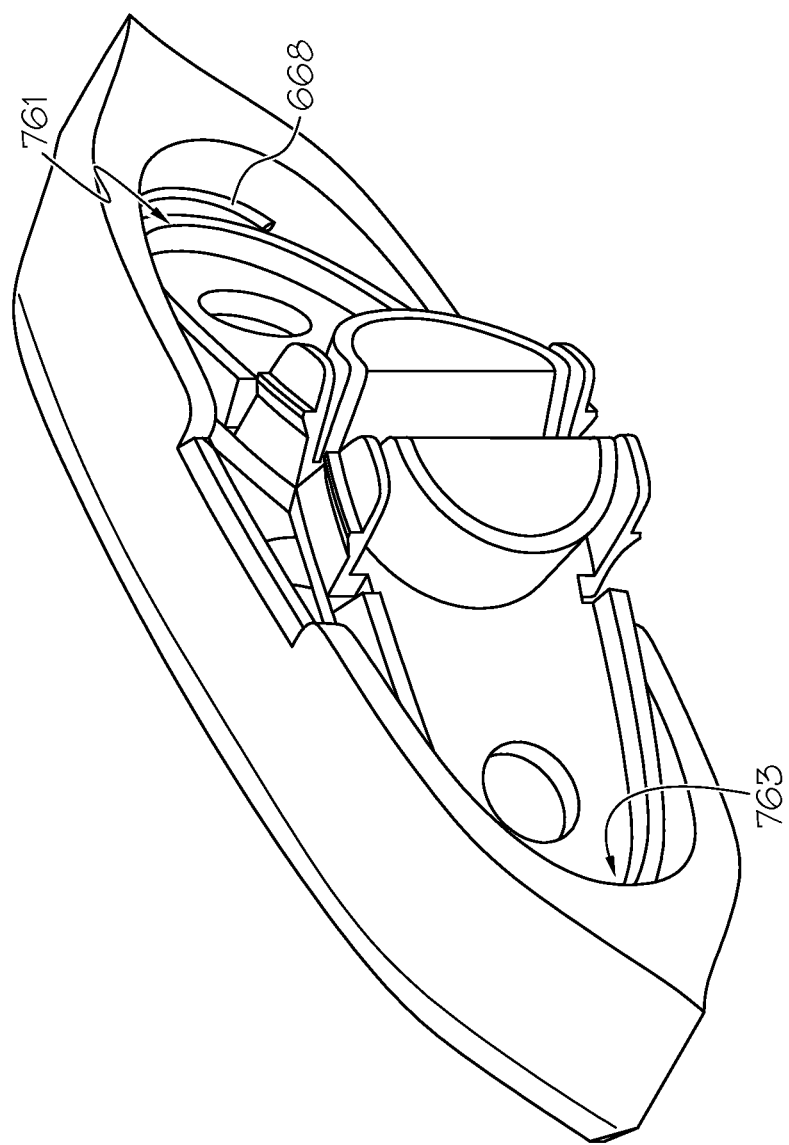

The recessed area 644 of the ring structure 632, in one embodiment, comprises a retaining area 666, 668 that securely retains outer areas of the first and second portions 662, 664 of the seal retaining member 636, respectively. FIG. 7 shows how the outer areas 761, 763 of the first and second portions 662, 664 of the seal retaining member 636 abut the retaining areas 666, 668 of the recessed area when fully extended.

An inner area of the first portion 662 and the second portion 664 include one or more retaining mechanisms 670, 672, 674, 676. In the example FIG. 6, a top region 671, 675 and a bottom region 673, 677 of the first and second portions 662, 664 of the seal retaining member 636 include a retaining mechanism 670, 672, 674, 676. Each of the retaining mechanism 670, 672, 674, 676 includes a protruding portion 678 that is received by a corresponding portion 680, 682 of the recessed area 644. In one embodiment, this corresponding portion 680, 682 is recessed such that when the protruding portion 678 mates with the corresponding portion 680, the protruding portion 678 abuts an inner area of the corresponding portion 680, thereby effectively "locking" the hinge motion of the seal retaining member 636. Each retaining mechanism 670, 672, 674, 676 also includes an area 684 that disengages the protruding portion 678 from the corresponding portion 680, 682 when the area 684 is depressed.

Figure 8:
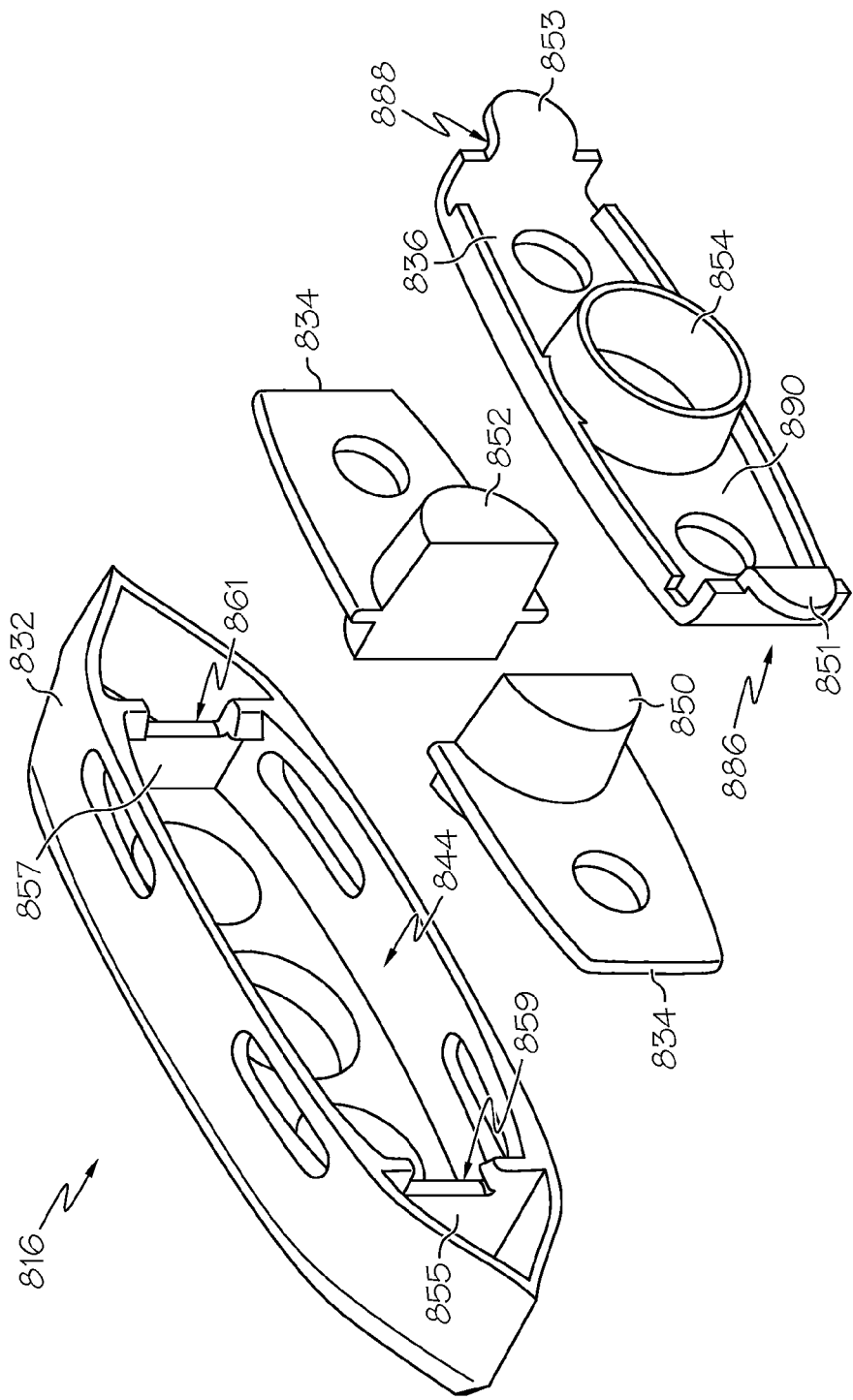

FIG. 8 shows an exploded view of another end cap/plug 816 according to another embodiment of the present invention. The end cap/plug 816 of FIG. 8 is similar to the end cap/plug 616 of FIG. 6 with the exception of at least the following differences. The seal retaining member 836 is rigid and does not comprise a hinge feature as the end cap/plug 616 of FIG. 6. Also, the seal retaining member 836 comprises a side end portion 886, 888 on the left and right sides of the seal retaining member 836. These side end portions 886, 888 are substantially perpendicular to a main body portion 890 of the seal retaining member 836 that couples each of the side end portions 886, 888.

Each of the side end portions 886, 888 comprise a protruding portion 851, 853 that is substantially perpendicular to its respective side portion and parallel to the main body portion 890. These protruding portions 851, 853 extend outward and away from the side portions 886, 88 and the center of the seal retaining member 836. The recessed area 844 of the ring structure 832 comprises a vertical wall 855, 857 that corresponds to each side end portion 886, 888 and its protruding portion 851, 853.

For example, after the seal 834 is placed within the recessed area 844 in an area between the two vertical walls 855, 857, the seal retaining member 836 is then inserted into the recessed area 844. As the seal retaining member 836 is inserted into the recessed area 844, the protruding portions 850, 852 of the seal 834 are received by the corresponding receiving portion 854 of the seal retaining member 836. The side end portions 886, 888 abut a portion of the corresponding vertical wall 855, 857. Each vertical wall 855, 857 also comprises a recessed area 859, 861 that receives the protruding portion 851, 853 of its corresponding side end portion 886, 888. Therefore, the seal retaining member 836 is retained securely and tightly within the ring structure 832. A user can remove the seal retaining member 836 by applying a pulling force to one or more of the protruding portions 851, 853 of one or more of the side end portions 886, 888.

Figure 9:
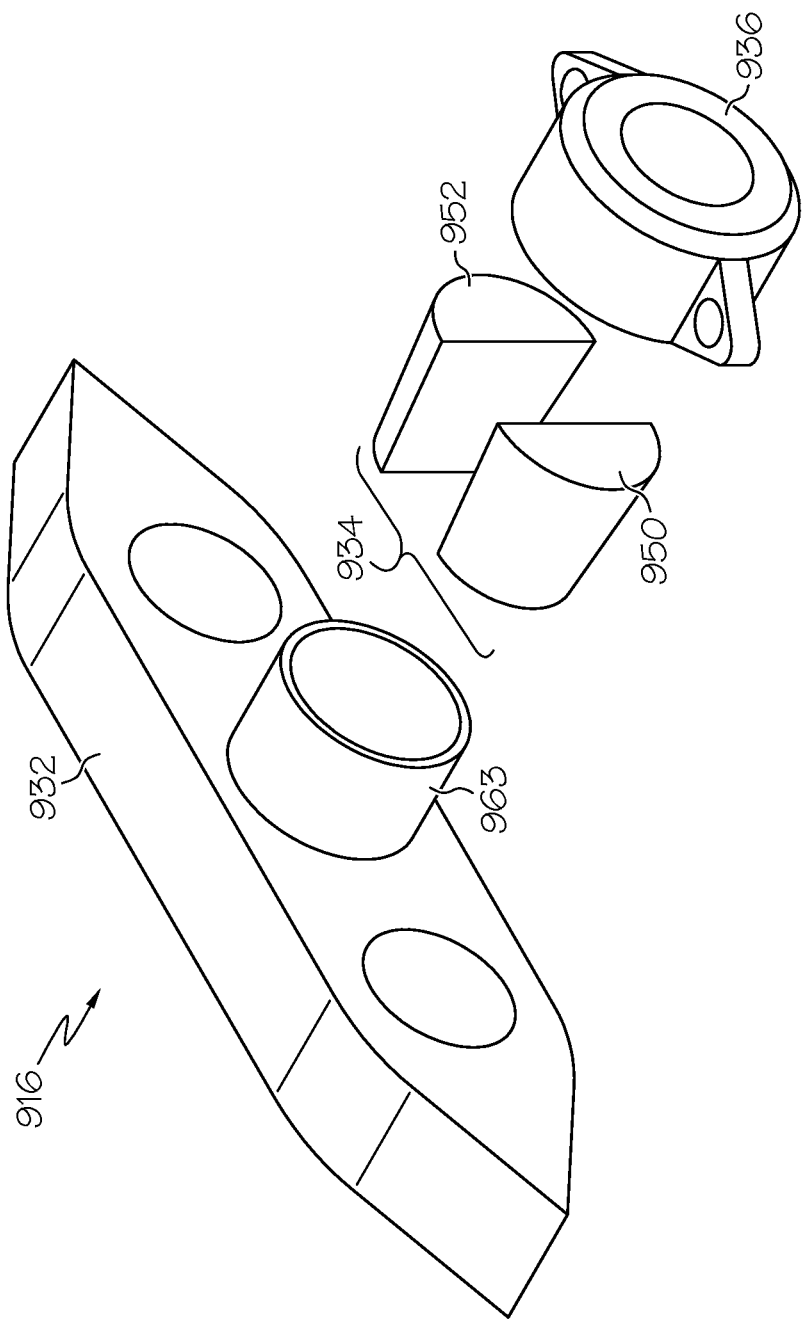
Figure 10:
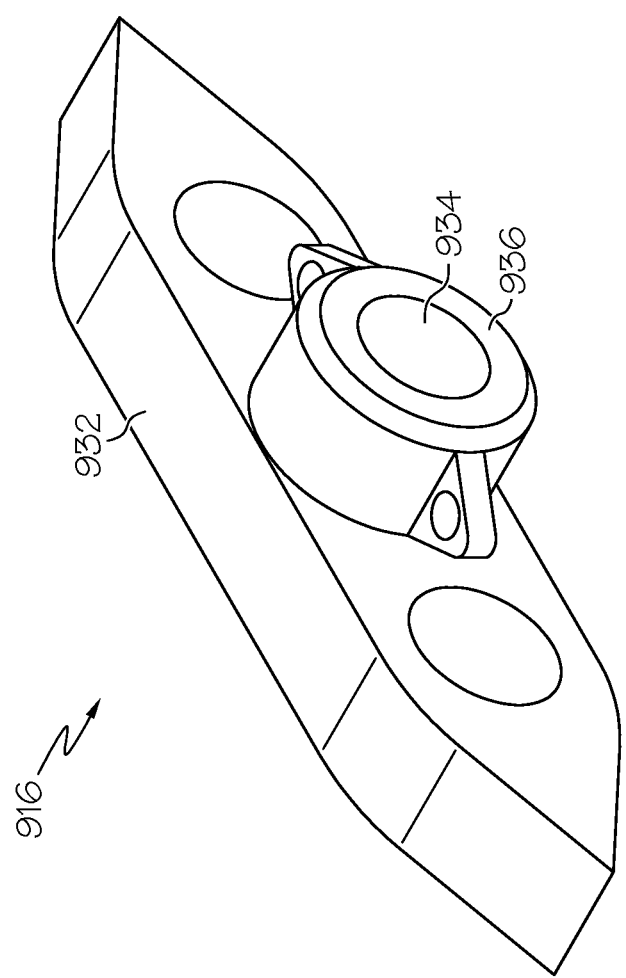

FIG. 9 shows an exploded view of another end cap/plug 916 according to one embodiment of the present invention. In particular, FIG. 9 shows a ring structure 932 comprising a hollow protruding region 963. The seal 934 comprises two or more portions 950, 952, as discussed above. However, each portion is configured to be inserted into the hollow protruding region 963 of the ring structure 932 such that a complete seal is created therein. The seal retaining member 936 is configured to receive the hollow protruding region 963 of the ring structure 932, thereby securely retaining the seal 934 within the hollow protruding region 963, as shown in FIG. 10. The seal retaining member 936 can be coupled to the hollow protruding region 963 using a threaded configuration, a push-on configuration, or the like.

Figure 11:
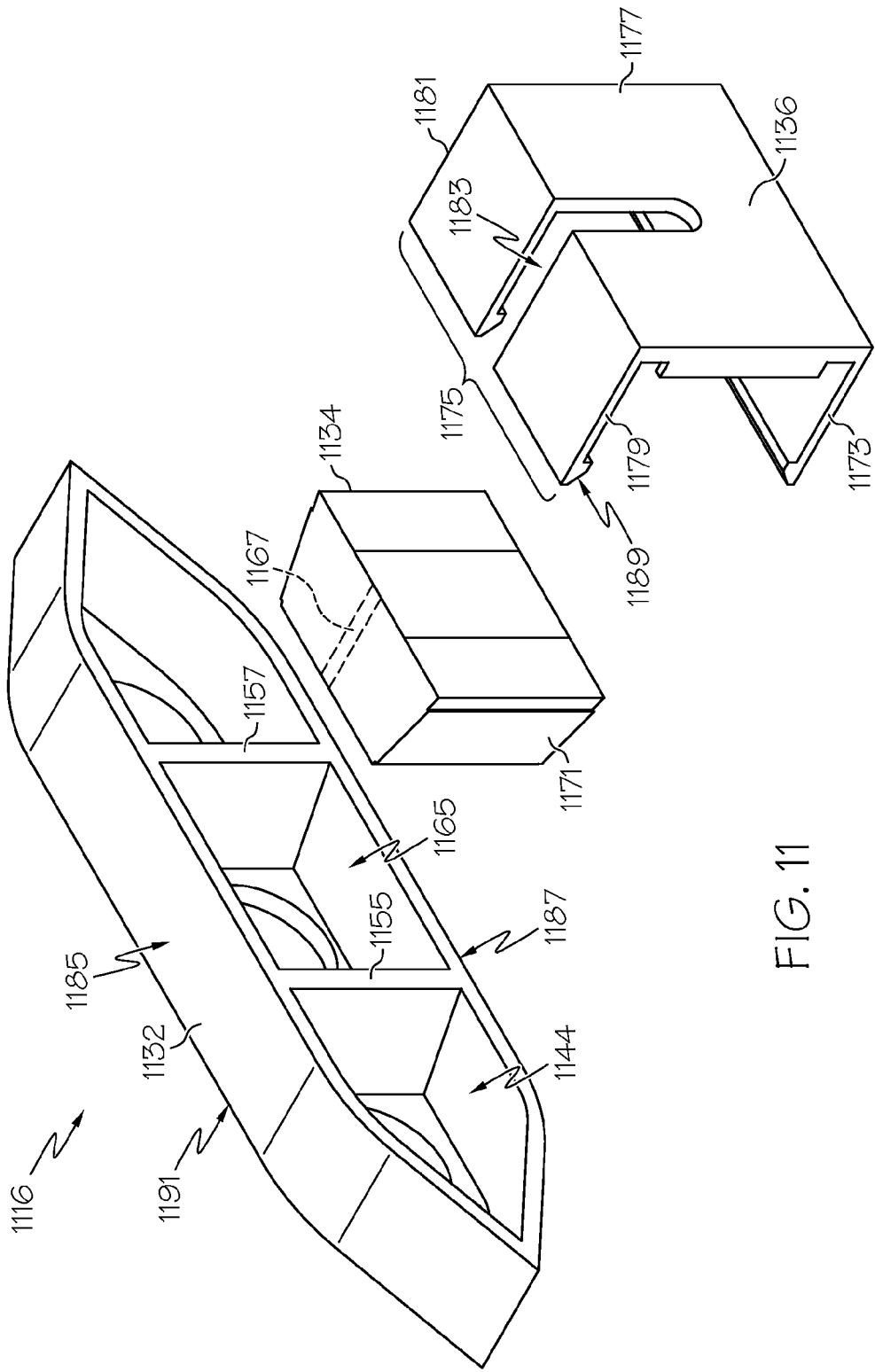

FIG. 11 shows an exploded view of an end cap/plug 1116 according to yet another embodiment of the present invention. In particular, FIG. 11 shows that the ring structure 1132 comprises a recessed area 1144. The recessed area 1144 includes two vertical walls 1155, 1157 that define a receiving area 1165 for receiving the seal 1134. In the example of FIG. 11, the seal 1134 is one piece and comprises a slotted area 1167 that allows a cord to transition from the inside of the enclosure 100 to the outside of the enclosure 100. When the seal 1134 is inserted into the receiving area 1165 a secure and tight seal is created within the receiving area 1165. When a wire is within the slotted area 1167 the seal is maintained since pressure is exerted on all sides of the receiving area 1165 by the seal 1134.

The seal 1134, in one embodiment, comprises a material such as (but not limited to) plastic on one or more portions 1171 (e.g., top, bottom, sides, back) of the seal 1134. This material reduces the friction experienced by the seal 1134 when being inserted into the receiving area 1165. The reduced friction makes inserting and removing the seal 1134 easier. The seal retaining member 1136 comprises a bottom portion 1173, a top portion 1175, and a back portion 1177. In one embodiment, the top portion 1175 comprises a first portion 1179 and a second portion 1181 that are separated by a slotted area 1183 that extends partially down the back portion 1177. This slotted area 1183 corresponds to the slotted area 1167 of the seal 1134 and allows a wire(s) to exit the enclosure.

The first and second portions 1179, 1181 of the top portion 1175 abut an outer top portion 1185 of the ring structure 1132. The bottom portion 1173 abuts an outer bottom portion 1187 of the ring structure 1132. Each of the first and second portions 1179, 1181 of the top portion 1175 comprise a downward angled protruding member 1189 that extends past a back edge 1191 of the outer top portion 1185 of the ring structure 1132 and "grabs" this edge 1191 create where the outer top portion 1185 meets with the back portion of the ring structure 1132. This "grabbing" feature securely retains the seal retaining member 1136 to the ring structure 1132. It should be noted that the bottom portion 1173 of the seal retaining member 1136 can include similar features that securely retains the bottom portion 1173 of the seal retaining member 1136 to the ring structure 1132.

Figure 12:
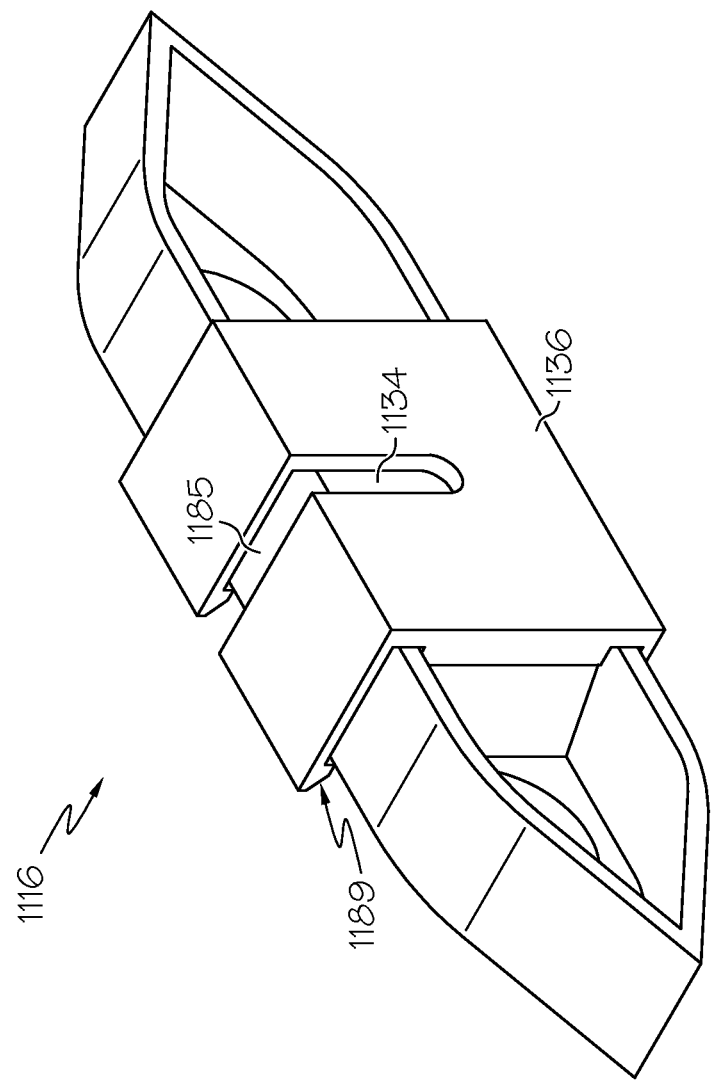

The back portion 1177 of the seal retaining member 1136 includes a first inward extending member 1197 and a second inward extend member 1199 that are perpendicular to the back portion 1177. Each of these first and second inward extending members/ribs 1197, 1199 exert a force on the corresponding vertical wall 1155, 1157. This force also helps to position and securely retain the seal retaining member 1136 to the ring structure 1132, as shown in FIG. 12.

Figure 13:
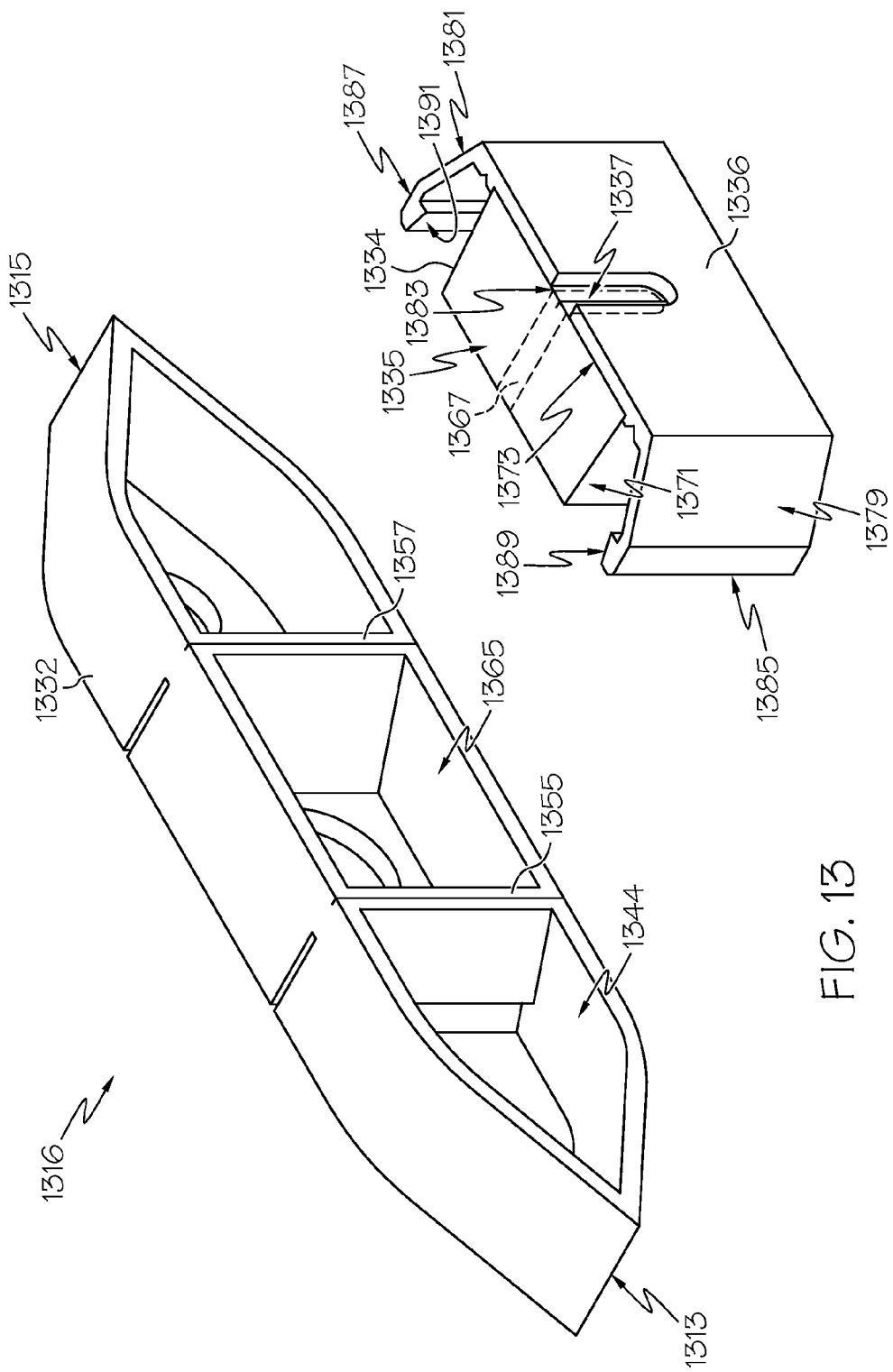

FIG. 13 shows an exploded view of an end cap/plug 1316 according to another embodiment of the present invention. In particular, FIG. 13 shows that the ring structure 1332 comprises a recessed area 1344. The recessed area 1344 includes two vertical walls 1355, 1357 that define a receiving area 1365 for receiving the seal 1334. In the example of FIG. 13, the seal 1334 is one piece and comprises a slotted area 1367 that extends from a top portion 1335 of the seal 1334 to at least a front portion 1337 of the seal 1334 that faces a middle portion 1377 of the seal retaining member 1336. This slotted area 1367 allows a cord/wire to transition from the inside of the enclosure 100 to the outside of the enclosure 100. When the seal 1334 is inserted into the receiving area 1365 a secure and tight seal is created within the receiving area 1365. When a wire is within the slotted area 1367 the seal is maintained since pressure is exerted on all sides of the receiving area 1365 by the seal 1334. An adhesive material can disposed within the receiving area 1365 and/or the seal 1334 to further secure the seal 1334 within the receiving area 1365.

The seal 1334, in one embodiment, comprises a material such as (but not limited to) plastic on one or more portions 1371 (e.g., top, bottom, sides, back) of the seal 1134 similar to that discussed above with respect to FIG. 11. The seal retaining member 1336 comprises a middle portion 1377 and first and second side portions 1379, 1381 that extend from the middle portion 1377. In the example of FIG. 13, the first and second side portions 1379, 1381 are angled outward and away from the middle portion 1377. In one embodiment, the middle portion 1377 comprises a slotted area 1383 that extends partially down the middle portion 1377. This slotted area 1383 corresponds to the slotted area 1367 of the seal 1334 and allows a wire(s) to exit the enclosure 100. In one embodiment, an inner surface 1373 of the middle portion 1377 that abuts the front portion 1337 of the seal 1334 comprises an adhesive material to secure the seal 1334 to the seal retaining member 1336.

Figure 14:
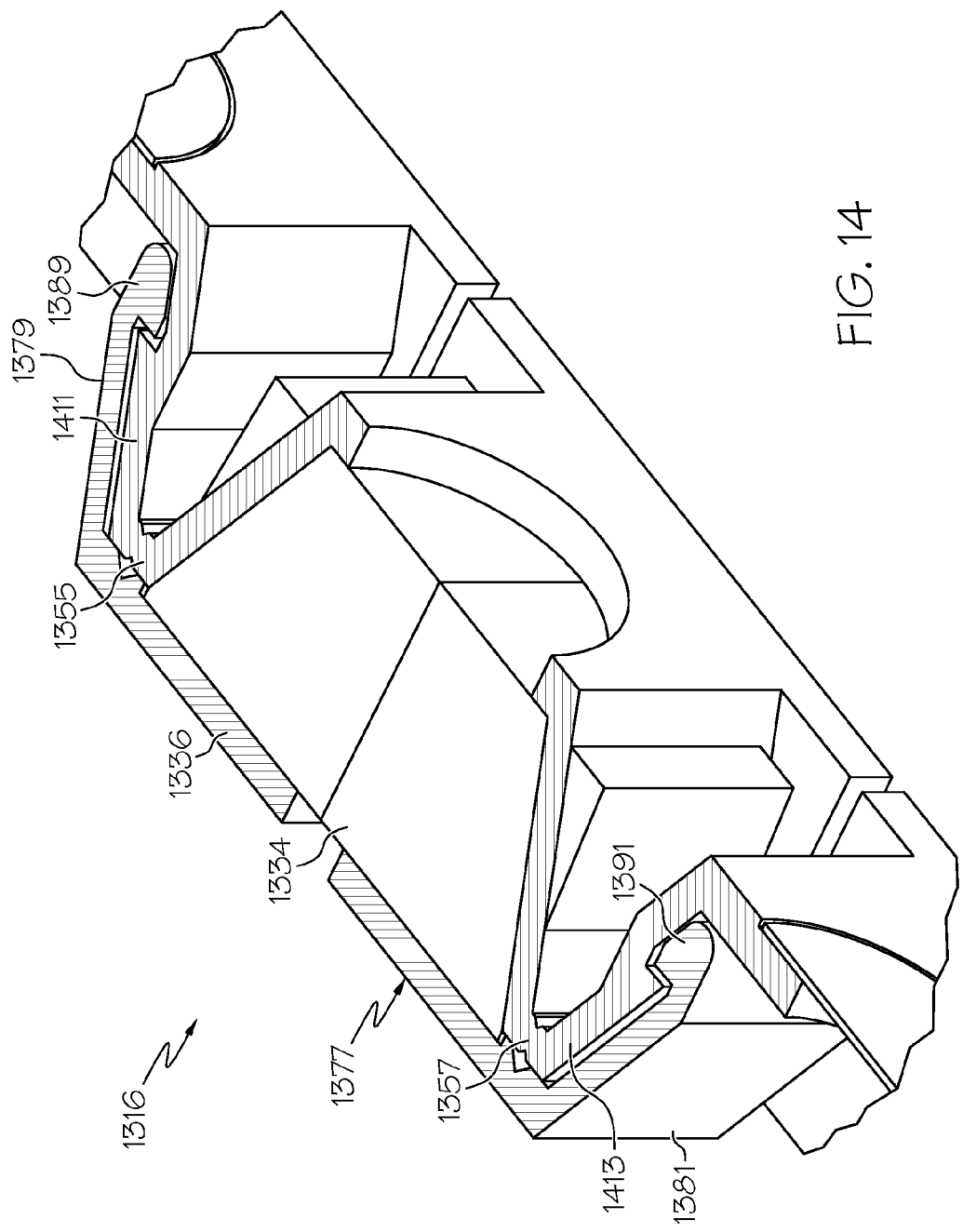

An end portion 1385, 1387 of the first and second side portions 1379, 1381 of the seal retaining member 1336 each comprise an inward angled (e.g., toward the inner surface 1373 of the middle portion 1377) protruding member 1389, 1391. As the seal retaining member 1336 is inserted into the ring structure 1332 to secure the seal 1334 within the receiving area 1365, the first and second side portions 1379, 1381 of the seal retaining member 1336 encounter the outer portion 1411, 1413 of the two vertical walls 1355, 1357 of the recessed area 1344, as shown in FIG. 14. In one embodiment, the two vertical walls 1355, 1357 are angled outward towards the ends 1313, 1315 of the ring structure 1332. Each vertical wall 1355, 1357 also comprises a recessed area 1317, 1319. In one embodiment, the angle of the two vertical walls 1355, 1357 is greater than the angle of the first and second side portions 1379, 1381 of the seal retaining member 1336. Therefore, the first and second side portions 1379, 1381 of the seal retaining member 1336 are flexed outwards as they encounter the vertical walls 1355, 1357 of the recessed area 1344. Once the protruding members 1389, 1391 of the first and second side portions 1379, 1381 of the seal retaining member 1336 reach the recessed areas 1317, 1319 of the vertical walls 1355, 1357, the protruding members 1389, 1391 "grab" the recessed areas 1317, 1319, as shown in FIG. 14. This "grabbing" feature securely retains the seal retaining member 1336 to the ring structure 1332.

Figure 15:
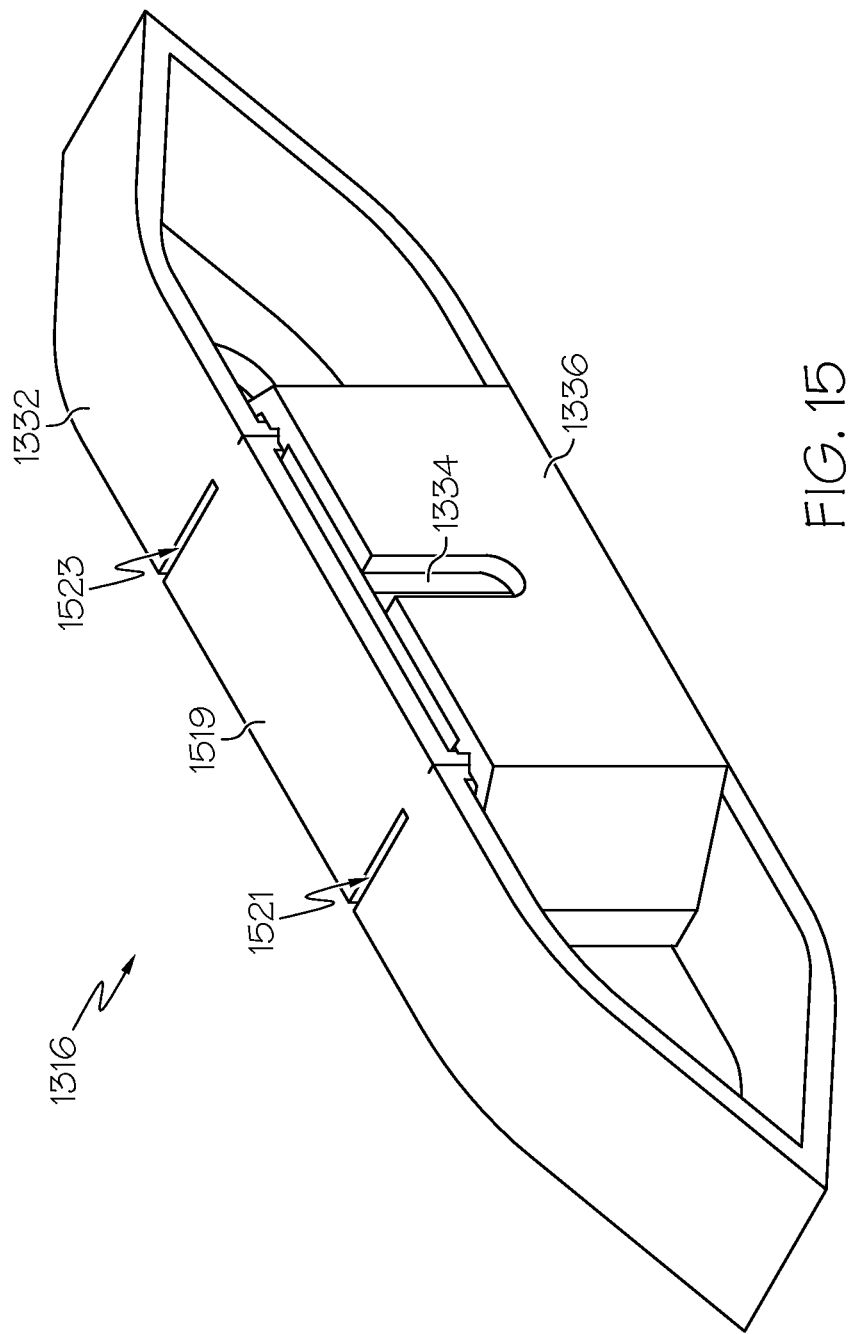
Figure 16:
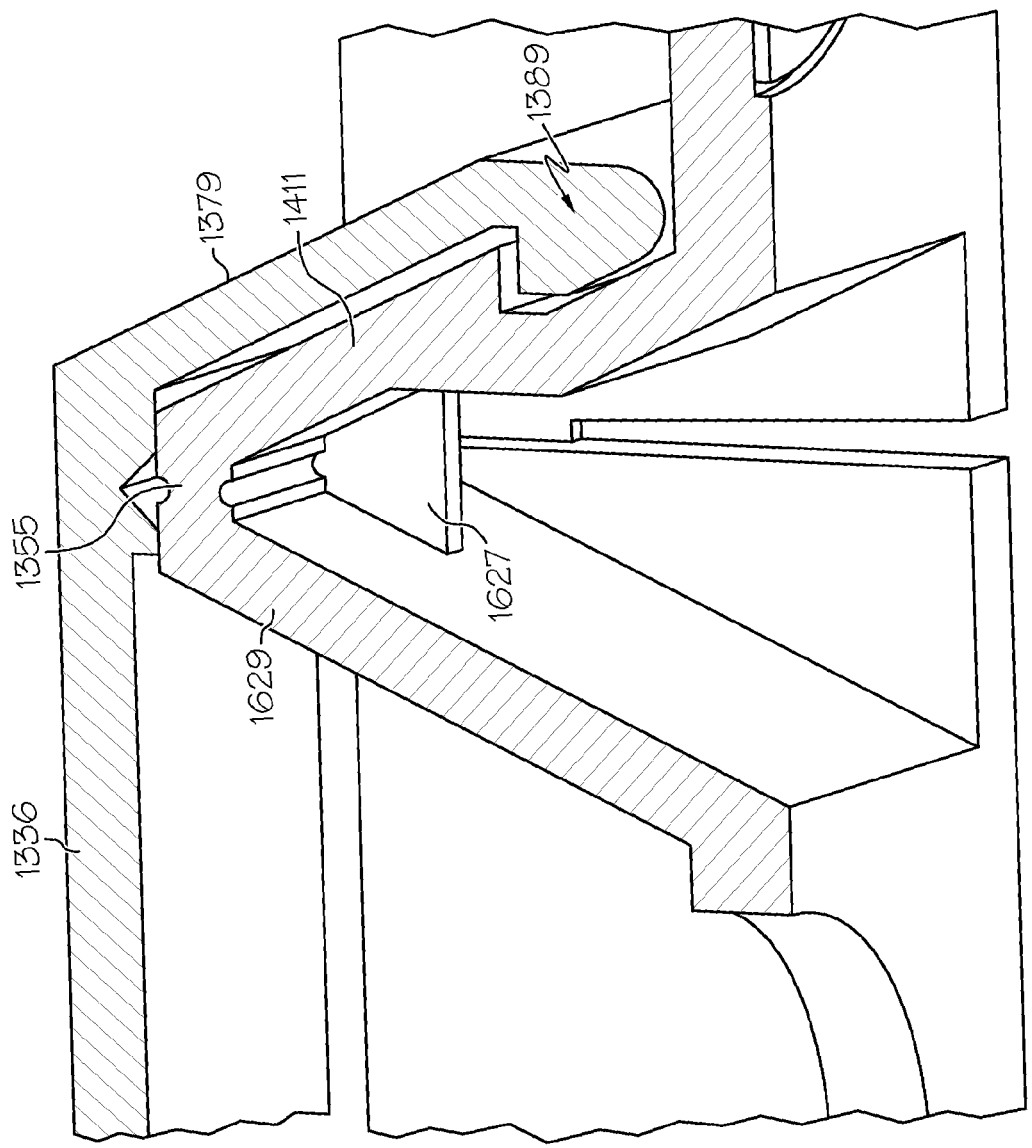

When the user wants to remove the seal retaining member 1336 and the seal 1334, the user can compromise (e.g., break or snap) the ring structure 1332 by applying a bending force. For example, FIG. 15 shows the seal 1334 and seal retaining member 1336 inserted into the ring structure 1332. The top portion 1519 of the ring structure 1132, in this embodiment, comprises one or more slotted areas 1521, 1523 that extend partially along and at least partially through the top portion 1519. In the example of FIG. 15, these slotted areas 1521, 1523 are disposed on the top portion 1519 at a location corresponding to the vertical walls 1355, 1357, as shown in FIG. 16. The bottom portion 1525 of the ring structure 1332 can also comprise one or more slotted areas 1521, 1523 as well. It should be noted that in one or more embodiments, the enclosure 100 is disposable and configured to be a "a one-time use only" protection device. Therefore, in this embodiment, once the ring structure 1132 is compromised the inner area of the enclosure 100 is no longer sealed and protected.

FIG. 16 also shows that at least one stability member 1627 is disposed between the outer portion 1411 of the vertical wall 1355 and an inner portion 1629 of the vertical wall 1355. This stability member 1627 provides rigidity to the ring structure 1332 so that the ring structure 1332 does not become unintentionally compromised. It should be noted that various portions of the vertical walls 1355, 1357 and top/bottom portions 1519, 1525 of the ring structure 1332 can be varied in thickness to further allow the user to compromise the ring structure 1332 for removing the seal 1334 and seal retaining member 1336. In the examples of FIGS. 13-16, the user is able to grasp the first end region 1313 with one hand and place his/her thumb on the middle portion 1377 of the seal retaining member 1336. The user is also able to grasp the second end region 1315 with the other hand and place his/her other thumb on the middle portion 1377 of the seal retaining member 1336. The user then applies a pushing force against the seal retaining member 1336 and a pulling force to the first and second end regions 1313, 1315. This causes the ring structure to become compromised at the slotted areas 1521, 1523 and other areas of the ring structure based on the varied thickness discussed above. The user is then able to remove the seal retaining member 1336 and the seal 1334.

As can be seen from the above discussion, various embodiments of the present invention provide an enclosure/device 100 that protects portable electronic devices 102 from various hazards such as water, snow, sand, dirt, debris, bumps/shocks, and the like. The enclosure/device 100, in some embodiments, comprises a breathable material that allows a user to interact with the various components of the portable electronic devices 102 disposed therein. An end cap/plug 316 is provided on the enclosure/device 100 that allows the portable electronic devices 102 and any accessories to be inserted and removed from the enclosure/device 100 while creating a seal that prevents any foreign objects from entering the enclosure/device 100.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

The invention claimed is:

1. A sealable membrane for protecting portable electronic devices, the sealable membrane comprises:
　an enclosure comprising a material, the enclosure comprising at least one edge with an opening configured to receive a portable electronic device thereinto, the enclosure having an inside surface and an outside surface, and the at least one edge is sealable with heat thereby preventing liquid from entering inside the enclosure through the edge; and
　an end cap that is insertable into the opening, the end cap comprising:
　　an annular member comprising a comprising a top portion and a bottom portion, wherein each of the top portion and the bottom portion comprises an outer surface and an inner surface, wherein the outer surface of the top and bottom portions forms a seal with the inside surface of the enclosure, the annular member forming a rigid conduit into the enclosure, the annular member further comprising an opening situated between the inner surface of the top portion and the inner surface of the bottom portion;
　　a sealing member that is disposed at a location that is at least one of flush with the opening of the annular member and at least partially within the opening of the annular member, the sealing member preventing access through the opening of the annular member; and
　　a retaining member coupled to at least one portion of the annular member, the retaining member retaining the sealing member at the location,
　　wherein the annular member further comprises a first wall that extends from the inner surface of the top portion to the inner surface of the bottom portion, and a second wall that extends from the inner surface of the top portion to the inner surface of the bottom portion, wherein the opening is disposed between the first wall and the second wall,
　　wherein the first wall and the second wall each comprises an outer region that is angled away from the opening, wherein each outer region comprises a recessed area,
　　wherein the retaining member comprises a first side portion, a second side portion, and a middle portion, wherein the first and second side portions extend from the middle portion and are angle away from the middle portion, and
　　wherein an end region of each of the first and second side portions of the retaining member comprises an angled protruding member configured to mate with the recessed area of the outer region of the first and second walls of the annular member, respectively.

2. The sealable membrane of claim 1, wherein at least a portion of the enclosure contours at least a portion of the portable electronic device.

3. The sealable membrane of claim 1, wherein the sealing member is configured to receive at least one wire coupled to the portable electronic device, the at least one wire extending from within the enclosure to outside the enclosure, and wherein the sealing member forms a seal around the at least one wire.

4. The sealable membrane of claim 1, wherein the material comprises vented regions configured to allow heat to escape from inside the enclosure.

5. The sealable membrane of claim 1, wherein a portion of the outside surface of the enclosure corresponding to a directional user input device of the portable electronic device comprises an adhesive coating.

6. The sealable membrane of claim 1, wherein a portion of the enclosure corresponding to a directional user input device of the portable electronic device comprises a raised region that extends from the inner surface to the outer surface of the enclosure, wherein at least a portion of the raised region extending from the inner surface substantially contacts the directional user input device.

7. An end cap for use with a sealable membrane that protects portable electronic devices, the end cap comprising:
   an annular member that is insertable into an opening of a sealable membrane used for protecting portable electronic devices, wherein the annular member comprises a top portion and a bottom portion, wherein each of the top portion and the bottom portion comprises an outer surface and an inner surface, the outer surface of the top and bottom portions is configured to form a seal with an inside surface of a sealable membrane, the annular member further comprising an opening situated between the inner surface of the top portion and the inner surface of the bottom portion;
   a sealing member that is disposed at a location that is at least one of flush with the opening of the annular member and at least partially within the opening of the annular member, the sealing member preventing access to an inner area of the sealable membrane through the opening of the annular member, wherein the sealing member comprises a first portion and at least a second portion, wherein the first portion is separate and removable from the second portion; and
   a retaining member coupled to at least one portion of the annular member, the retaining member retaining the sealing member at the location, wherein the retaining member comprises
      a top portion,
      a bottom portion situated opposite from the top portion,
      a first side portion disposed perpendicular to the top portion and the bottom portion,
      a second side portion disposed perpendicular to the top portion and the bottom portion and situated opposite from the first side portion
      an inner portion disposed between the top, bottom, first side, and second side portions,
      a circular extending portion that extends away from the inner portion and that is configured to receive the first portion and the second portion of the sealing member,
      wherein the first and second side portions each comprise at least one retaining mechanism configured to mate with a respective mating area of the annular member disposed between the inner surface of the top portion and the inner surface of the bottom portion of the annular member.

8. The end cap of claim 7, wherein the sealing member comprises a first portion and at least a second portion, wherein the first portion is separate and removable from the second portion,
   wherein the retaining member comprises a first member corresponding to the first portion of the sealing member and a second member corresponding to the second portion of the sealing member,
   wherein each of the first member and the second member comprises
      a first outer portion,
      a second outer portion coupled to the first outer portion,
      an inner portion disposed between the first and second outer portion,
      an extending portion that extends away from the inner portion and that is configured to receive the first portion and the second portion, respectively, of the sealing member,
      wherein the first outer portion comprises at least a first retaining mechanism disposed above the extending portion, the first retaining mechanism configured to mate with a corresponding portion of the inner surface of the top portion of the annular member, and
   wherein the second outer portion comprises at a second retaining mechanism disposed below the extending portion, the second retaining mechanism configured to mate with a corresponding portion of the inner surface of the bottom portion of the annular member.

9. The end cap of claim 7, wherein the opening of the annular member is disposed within a circular extending member that extends away from the top portion and the bottom portion,
   wherein the sealing member comprises a first portion and at least a second portion, wherein the first portion is separate and removable from the second portion, and
   wherein the retaining member is substantially circular and comprises an opening configured to receive the circular extending member of the annular member.

10. The end cap of claim 7, wherein the top and bottom portions of the annular member each comprise a first edge portion, a second edge portion situated opposite the first edge portion, and a middle portion situated between the first and second edge portions, and
    wherein the retaining member comprises a top portion, a bottom portion, and a middle portion, wherein the top and bottom portions extend from and are perpendicular to the middle portion, wherein the top portion is parallel with respect to the bottom portion,
    wherein an end region of at least one area of the top portion of the retaining member comprises at least one angled protruding member, the at least one angled protruding member coupling to the first edge portion of the top portion of the annular member, and
    wherein an inner surface of the bottom portion of the retaining member abuts an outer surface of the middle portion of the bottom portion of the annular member.

11. The end cap of claim 7, wherein the annular member further comprises a first wall that extends from the inner surface of the top portion to the inner surface of the bottom portion, and a second wall that extends from the inner surface of the top portion to the inner surface of the bottom portion, wherein the opening is disposed between the first wall and the second wall, wherein the first wall and the second wall each comprise an outer region that is angled away from the opening, wherein each outer region comprises a recessed area, wherein the retaining member comprises a first side portion, a second side portion, and a middle portion, wherein the first and second side portions extend from the middle portion and are angle away from the middle portion, and wherein an end region of each of the first and second side portions of the retaining member comprises an angled protruding member configured to mate with the recessed area of the outer region of the first and second walls of the annular member, respectively.

* * * * *